United States Patent [19]

Anderson, Jr. et al.

[11] 4,260,346
[45] Apr. 7, 1981

[54] PRESS ASSEMBLY FOR POWDER MATERIAL

[76] Inventors: Raymond B. Anderson, Jr., 1838 N. Country La., Pasadena, Calif. 91107; Aksel S. Jensen, 13635 Linfield Ave., Sylmar, Calif. 91345

[21] Appl. No.: 82,868

[22] Filed: Oct. 9, 1979

[51] Int. Cl.² .................. B30B 15/22; B30B 11/02
[52] U.S. Cl. ................................ 425/78; 425/352
[58] Field of Search ............ 425/78, 352, 344, 149, 425/152; 72/453.06, 453.09

[56] References Cited

U.S. PATENT DOCUMENTS

| | | | |
|---|---|---|---|
| 2,336,982 | 12/1943 | Cremer | 425/78 |
| 2,562,876 | 8/1951 | Baeza | 425/78 |
| 2,831,212 | 4/1958 | Belden | 425/78 |
| 3,078,540 | 2/1963 | Bush | 425/78 |
| 3,172,156 | 3/1965 | Belden | 425/78 |
| 3,172,182 | 3/1965 | Assmann | 425/78 |
| 3,191,232 | 6/1965 | Haller | 425/78 |
| 3,337,916 | 8/1967 | Smith | 425/78 |
| 3,559,243 | 2/1971 | Hermes | 425/78 |
| 3,587,136 | 6/1971 | Hermes | 425/78 |
| 3,647,332 | 3/1972 | Schmaus | 425/78 |
| 3,664,784 | 5/1972 | Sibley | 425/78 |
| 3,690,805 | 9/1972 | Kopicko | 425/78 X |
| 3,777,539 | 12/1973 | Priebe | 72/453.09 |
| 3,802,818 | 4/1974 | Watanabe et al. | 425/78 |
| 3,830,615 | 8/1974 | Walchhuetter | 425/344 |
| 3,847,008 | 8/1974 | Schmoll et al. | 72/453.06 X |
| 3,868,201 | 2/1975 | Jabobson et al. | 425/78 |
| 3,938,920 | 2/1976 | Fleissner | 425/78 |
| 4,000,231 | 12/1976 | Peterson | 425/78 X |
| 4,014,634 | 3/1977 | Hoshino | 425/78 |

*Primary Examiner*—J. Howard Flint, Jr.
*Attorney, Agent, or Firm*—Jackson, Jones & Price

[57] ABSTRACT

The present invention is directed to an improved powder press assembly of the withdrawal die type that is capable of subjecting the frame and die set to only compressive forces while accurately maintaining the dimensions of a compacted part. Mechanical stops are provided in upper and lower ram assemblies and cooperate with a multifunction push rod assembly to provide bilateral press position. The high and low pressure hydraulic system provides an economical use of the power requirements and further includes a bypass valve in a main pressure cylinder to accommodate rapid movement of the upper ram assembly.

39 Claims, 5 Drawing Figures

PRESS ASSEMBLY FOR POWDER MATERIAL

BACKGROUND OF THE INVENTION

1. Field of the Invention

The present invention is directed to an improved powder press assembly capable of subjecting the frame and die set to only compressive forces while accurately maintaining the dimensions of compactive parts and more particularly to a press assembly having mechanical stops in the upper and lower ram assemblies, a multi-function push rod assembly and a dual hydraulic system including a bypass valve in the main pressure cylinder.

2. Description of the Prior Art

A number of companies have manufactured compacting powder presses of up to 1,000 tons capacity and in special applications have created presses capable of 10,000 tons and greater force. Press manufacturers have recognized the advantages of accurately forming complex shaped parts from powder with a compacting press assembly to eliminate expensive machining and labor costs. These parts have been found useful in almost every major industry. A number of different materials can be utilized in a powder compacting press, for example, various forms of metal powders, aluminum, carbides, carbons, ceramics, stainless steel, ferrites, glass, fluorocarbon resins, etc.

As can be readily appreciated by a person skilled in this industry, the cost of these high pressure compacting presses represent a large capital investment. Generally, most of the presses do not have the ability to press exactly to both an exact part height as well as to an exact density. Frequently, parts are relatively complex or have multi-levels with counterbores, through holes, flanges, tapers or hubs and accordingly, require a plurality of die sets to interact to produce the final shape of the part. Because of this complex and sometimes extensive surface area, considerable friction can be generated between the formed part and the die sets and quite frequently the ejection capacity of a compacting press must be 50% or greater of the pressing capacity. Most commercial mechanical and hydraulic presses do not have the capability to create ejection forces as great as their compression forces particularly throughout the entire ejection stroke.

A number of compacting presses utilize a mechanical power source as can be seen in the Assmann U.S. Pat. No. 3,172,182 or a combination of hydraulic and mechanical power. In the ejection mode, the die set members can be subjected to tension forces and require appropriate heavier tooling component design. The prior art has further suggested various forms of powder metallurgic presses utilizing auxiliary hydraulic systems and controlled stops for positioning such as shown in the Bush U.S. Pat. No. 3,078,540 and the Walchhuetter U.S. Pat. No. 3,830,615.

The Cremer U.S. Pat. No. 2,336,982 is cited of interest to disclose a unidirectional compressive force stroke during both pressing and ejection. The Belden U.S. Pat. No. 2,831,212 is cited to disclose an arrangement of a prepressing die control. The Hermes U.S. Pat. No. 3,587,136; Priebe U.S. Pat. No. 3,777,539 and Schmoll et al U.S. Pat. No. 3,847,008 are cited of general interest.

There is a need in the compacting press industry for a superior compacting press capable of generating repeatable close part height tolerance with equal compacting and ejection force for all tonnage ranges. It is also desirous in the compacting press industry to subject the tooling members only to compression while maintaining an ability to press to positive stops.

SUMMARY OF THE INVENTION

The present invention provides an improved press assembly capable of forming parts from various types of compactible powder and includes a housing frame that supports a relatively movable upper ram assembly. The upper ram frame can be driven by both a high pressure drive cylinder and auxiliary low pressure drive cylinders. A movable die assembly can be mounted within the press and can be selectively engaged with the compressive force of the upper ram frame through the use of push rods movably mounted on the upper ram frame. The push rods can provide a pre-press function in moving the die assembly down during the initial portion of the press cycle while also providing positive mechanical stops during the final compacting mode of operation. Finally, the push rods can further push the die assembly downward during the ejection mode of operation.

The press can accommodate a withdrawal die set and further incorporates mechanical stops in both the upper ram assembly and also in a lower ram assembly to permit the press to accurately position the die relative to the upper and lower punches in the final press position. These mechanical stops do not rely on any hydraulically trapped fluid and thereby provides an extremely accurate positioning of the die to maintain a repeated dimensional stability for the formed parts. The upper mechanical stop is rotatively mounted with an adjustment bearing nut for the upper punch member. Rotation of the upper mechanical stop permits the release of stresses prior to any substantial rotation of the stop's upper and lower component members.

To facilitate movement of the high pressure hydraulic piston, a bypass valve is provided in the piston head for the purpose of quickly transferring fluid from the top to the bottom of the cylinder or vice versa, thereby reducing the fluid requirement during rapid movement of the upper ram assembly.

Each of the die set members are subjected to only a compressive force during both the pressing and ejection cycle. The ejection force created by the press assembly is equal to the pressing force for the full ejection stroke and both the pressing force and ejection force is generated in a unitary downward stroke of the upper ram assembly.

The objects and features of the present invention which are believed to be novel are set forth with particularity in the appended claims. The present invention, both as to its organization and manner of operation, together with further objects and advantages thereof, may best be understood by reference to the following description, taken in conjunction with the accompanying drawings.

DESCRIPTION OF THE PREFERRED EMBODIMENTS

The following description is provided to enable any person skilled in the compacting press art to make and use the invention and sets forth the best mode contemplated by the inventors of carrying out their invention. Various modifications however, will remain readily apparent to those skilled in the art, since the generic principles of the present invention have been defined herein specifically to provide a relatively economical press such as a powder metal press that can be easily manufactured and used to produce finished pressed parts.

Figure 1:
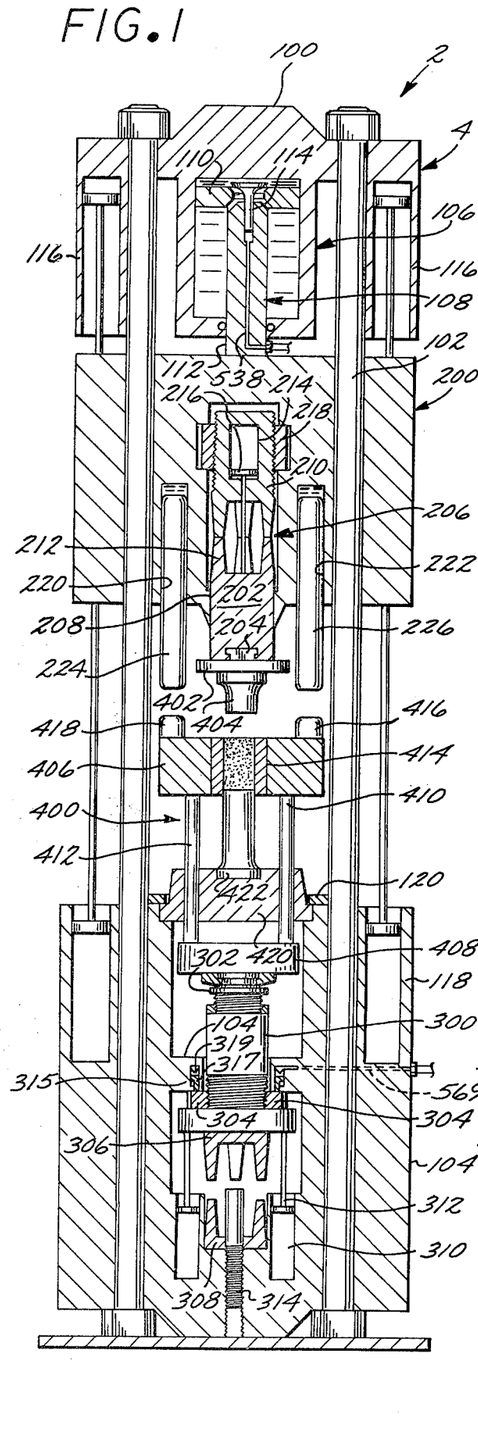
FIG. 1 is a front schematic cross-sectional view of a compacting powder press of the present invention in a full position.

Referring to FIG. 1, the press 2 of the present invention is capable of forming both simple and intricate parts from a large number of different powders such as various metal powders, metal oxides, carbides, chemical, glass, resins, etc. The preferred embodiment is disclosed having a maximum pressing powder capability of approximately 200 tons with a withdrawal die set. The ejection power capability is also 200 tons throughout the full ejection stroke. As can be readily appreciated by a person skilled in this art, the particular pressing tonnage can be varied to a greater or lesser extent by appropriate design adjustment. Since the key tooling components are subjected to compressive stresses only during both the pressing and ejection cycle, they can be optimally designed.

The present invention permits close axial tolerances with precise control of the pressing forces. The capability of 100% ejection pressure for the full ejection stroke insures complete ejection from any die cavity even with high wall friction for complex parts with large axial surface areas.

While not shown, it should be understood that this press incorporates the same features as other automatic presses that are commercially available such as hydraulically activated feed shoes positioned for either gravity or suction fill, automatic part push-off, the ability to utilize multiple tooling components for complex part production, simplified tooling and accurate machine alignment. Additionally, the operation of the press is particularly capable of accommodating automatic controls such as microprocessors.

The die can be adjusted to insure proper powder fill distribution. Since the tooling components are always subjected to a compressive force, and always in a downward direction, the final compacted part will remain stationary and will not be disturbed after it is pressed until ejection has been completed.

The principle features of the present invention will hereinafter be described with reference to schematic drawings that have been simplified simply for ease of illustration purposes. As can be appreciated, the die set assembly has also been illustrated in a schematic format and for the formation of a relatively simple part. Accordingly, the generic principles of the present invention, although disclosed in this schematic format should not be so limited because in actual practice the configuration of various component parts of both the die holder and the press will be varied within the inventive generic principles.

A. Fixed Frame and Tie Rod Assembly

Referring to FIGS. 1 through 4, the frame member 4 for the press 2 comprises not only an exterior housing (not shown) but for purposes of the present invention it is to be understood to include any stationary support reference or mounting position. The frame member 4 includes an upper cross bar 100 that is appropriately connected to four tie rod members 102. The tie rods 102 are correspondingly anchored onto a lower frame 104 that in turn, is anchored to a stationary mounting position such as the floor of a factory or mounted in a pit that extends beneath the floor level of the factory to provide an operator working surface of approximately four feet above the factory floor. As can be appreciated, both the upper cross bar 100 and the lower frame 104 can be a unitary part or a combination of subparts.

It should be understood that tie rods 102 serve as guides or alignment for the upper ram frame 200 in its up and down movement between upper cross bars 100 and lower ram frame 104. Suspended from the upper cross bar 100 is a high pressure main drive cylinder 106 and a high pressure piston 108 whose rod is appropriately connected to a high pressure hydraulic system to be described subsequently. A piston head 110 and a piston stem 112 incorporate an internal transfer valve 114 that can be pilot operated to insure a rapid transfer of hydraulic fluid from one side to the other side of the piston head 110 during a rapid downward or upward movement of the upper ram frame 200 by auxiliary cylinders 116.

The low pressure auxiliary drive cylinders 116 are mounted on the upper cross bar 100 and are fluidly connected to a low pressure hydraulic system. The auxiliary drive cylinders 116 are further connected to a movable upper ram frame 200. On the lower frame 104, two or more counter balance cylinders 118 are provided and are also connected to the movable upper ram frame 200 to support its dead weight. Finally, a hydraulic die set clamp 120 is supported on the lower frame 104 to lock a removable die set assembly 400 in place.

B. Movable Upper Ram Assembly

The upper ram frame 200 is movably mounted on the tie rods 102 and attached to the piston stem 112 of the high pressure piston 108. An upper ram member 202 is mounted on the ram frame 200 and incorporates a lower T-slot cavity 204 to mount an appropriate upper punch. As can be appreciated, other arrangements for mounting punches could be utilized. The other end of the upper ram member 202 forms part of an upper rotatable intermeshing stop 206 having a first load bearing serrated member 208 and a second rotatable load bearing serrated member 210. Modular teeth 212 are mounted on both the upper stop load bearing member 210 and the lower stop load bearing member 208 and are so configured that they can mesh when axially revolved. The pressure contact face of each stop tooth can be flat or inclined to the horizontal to assist in relatively releasing the stop bearing members after final pressing.

The serrated upper mechanical stop member 210 is rotatively mounted within the adjustment bearing nut 218. Rotation of this stop 210 within the adjustment nut 218 permits the release of residual stresses prior to significant movement in a vertical direction and aligns stops 210 and 204 to intermesh. A cylinder 214 mounted within this stop, can at anytime prior to or during the ejection cycle, be activated to raise the upper ram 202.

In this manner the upper punch 404 is lifted away from the compact part. The arrangement also permits the upper rotatable stop 210 to intermesh into the upper stop 204 during ejection while still maintaining a hydraulic spring force on the compact part being ejected from the die.

The upper ram frame 200 further supports a pair of hydraulic push rod cylinders 220 and 222 that respectively mount a pair of push rods 224 and 226 that can be adjustably extended downward from the frame 200. Each end of the push rods 224 and 226 are designed to bear and transmit the maximum force capable of being generated by the press 2. The cylinders 220 and 222 are connected via a relief valve to the low pressure hydraulic system. Whie not shown in the schematic FIGS. 1 through 4, each of the above mentioned hydraulic cylinders 220 and 222 have appropriate connections to hydraulic lines and appropriate seals that have been removed to facilitate the explanation of the present invention.

C. Lower Ram Assembly

The lower ram 300 is movably mounted within the lower frame 104 and has mounted, in a threaded female bore in its upper end, a lower T-slot die set connector 302 having a threaded shaft. This threaded mounting permits press position adjustment which can be automatically adjusted by press component parts (not shown). The lower end of the lower ram 300 has an intermediate threaded shaft portion that is designed to coact with a fill adjustment nut 304. This fill adjustment nut 304 can have external gear teeth to accommodate a motor drive, for automatic remote adjustment of the powder fill. To facilitate over or under filling of powder in the mold cavity, a ring cylinder 315 is provided about the lower ram 300. The cylinder 315 is hydraulically connected to valve 568 (to be subsequently described) by conduit 569. Mounted in the cylinder 315 is a ring piston 317 appropriately sealed with seal 319. In each of the Figures, the ring piston 317 is retracted within the cylinder 315 since for ease of illustration a relatively simple compact operation is being described. However, it should be appreciated that the piston 317 can be extended to define an initial stop position to limit travel of the lower ram 300 for a predetermined fill position.

The lower ram 300 also mounts a lower stop serrated load bearing member 306 similar to the upper stop member 206. A rotatively mounted serrated load bearing stop member 308 is mounted on the lower frame 104 and along with the upper stop member 306 has modular teeth configured to permit intermeshing to thereby provide a bi-level positioning movement for the lower ram 300.

A pair of die set return cylinders 310 and pistons 312 are mounted on the lower frame 104 with the respective pistons 312 directly connected to an extension of the lower ram 300. These die set return cylinders 310 are also connected to the low pressure hydraulic system and function to return the lower ram 300 to a fill position for the die.

Finally, an adjustable ejection stop 314 has a shaft threaded into a threaded female bore on the lower frame 104. The adjustable ejection stop 314 extends between the lower stop members and provides a continuous adjustment for a final stop position of the downward movement of the lower ram 300 during the ejection of the formed part.

D. Removable Die Set Assembly

As can be appreciated, various types of die sets having multiple platens can be utilized in the press 2 of the present invention.

The specific die set 400 illustrated herein is schematically disclosed to facilitate the description of the present invention and should not be considered limiting to the present invention. The die set 400 includes a punch holder 402 which connects to the upper ram 202 via a T-slot 204 and which secures an upper punch 404. A die table and holder 406 is connected to the lower die set platen 408 through a pair of die set tie rods 410 and 412. The die set platen 408 is, in turn, connected directly to the lower die set connector 302 mounted on the lower ram 300. The die table and holder 406 supports the actual die 414 providing the cavity for the powder. Supported on the surface of the die table 406 is a pair of compression pads 418 and 416 that have upper surfaces designed to interface with the respective push rods 224 and 226.

A lower punch holder 420 supports a lower punch 422 as is held fixed to the lower frame 104 by the hydraulic die set clamps 120.

E. Press Operation

Referring to the fill position disclosed in FIG. 1, and assuming that the adjustments for a prepress operation, fill and ejection have been set properly for the specific part to be produced and that the powder feed shoe (not shown) has filled the die cavity with the appropriate powder. The movable upper ram assembly 200 is driven rapidly downward by the two low pressure hydraulic auxiliary cylinders 116. During this rapid downward movement, the hydraulic oil in the lower half of the high pressure cylinder 106 is transferred through the internal transfer valve 114 to the upper half of the cylinder 106. While not shown in FIG. 1, the internal transfer valve 114 is spring biased to a closed position but is controlled by a pilot line connected to the low pressure hydraulic system for forcing the valve to an open position.

At a preselected position before the push rods 224 and 226 contact the compression pads 418 and 416 on the die table 406 and before the upper punch 404 has entered the die 414, the press speed is reduced and the internal transfer valve 114 closes. As can be appreciated, the internal transfer valve 114 has permitted the quick transfer of hydraulic fluid from the bottom to the top of this cylinder and facilitates the rapid approach of the upper ram frame 200 by reducing the hydraulic fluid requirement. With the internal transfer valve 114 closed, the main hydraulic cylinder 106 can now drive the upper ram frame 200 at a slower rate and with greater force.

Figure 2:
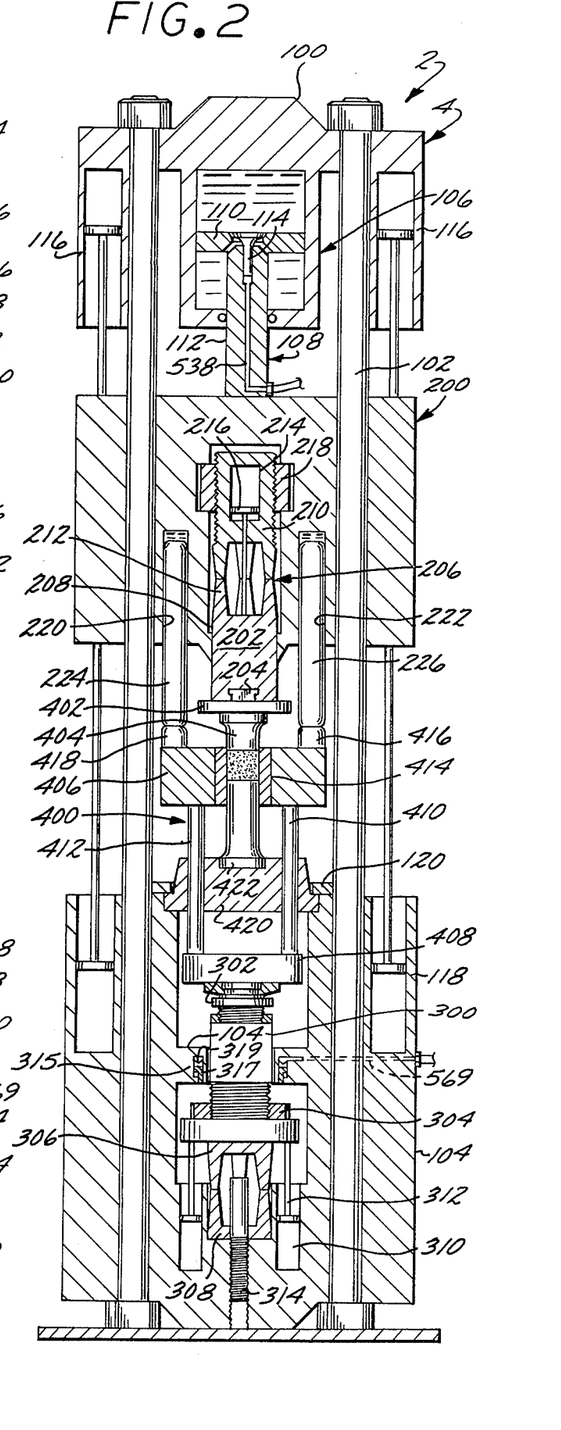
FIG. 2 is a front schematic cross-sectional view of the press of the present invention in a pre-press position.

FIG. 2 discloses the prepress position with the powder in the die 414 partially compacted. In this position, the upper punch 404 has closed off the die 414 and the respective push rods 224 and 226 have contacted the die table compression pads 418 and 416. The movable die assembly comprising the die table 406, die set tie rods 410 and 412 and the lower die set platen 408 are forced down against the lower ram assembly 300. As can be appreciated, this downward movement can be restricted by a counter pressure created by the hydraulic oil trapped in the bottom half of the die set return cylinders 310. As will be subsequently explained, this counter pressure can be automatically adjusted by an electrically controlled relief valve. The lower ram 300 will be moved downward until the lower stop member 306 contacts the rotatable intermeshing stop member 308. At this point in the press cycle, the prepressed operation has been completed.

Further downward movement, under the force of the high pressure main drive cylinder 106, will collapse the respective push rods 224 and 226 and cause them to bottom out in their respective cylinders 220 and 222, permitting the previously trapped oil to be returned to the tank. As was explained earlier, the push rods have been specifically designed for this purpose and likewise the cylinders have also been designed to accommodate this pressure contact. The collapsing of the respective push rods permits the upper punch 404 to enter deeper into the die 414. The relative collapsing movement of the push rods 224 and 226 can be adjusted by the counter pressure maintained in the hydraulic push rod cylinders 220 and 222. This adjustment can be controlled by an electrically controlled relief valve to be described subsequently.

Figure 3:
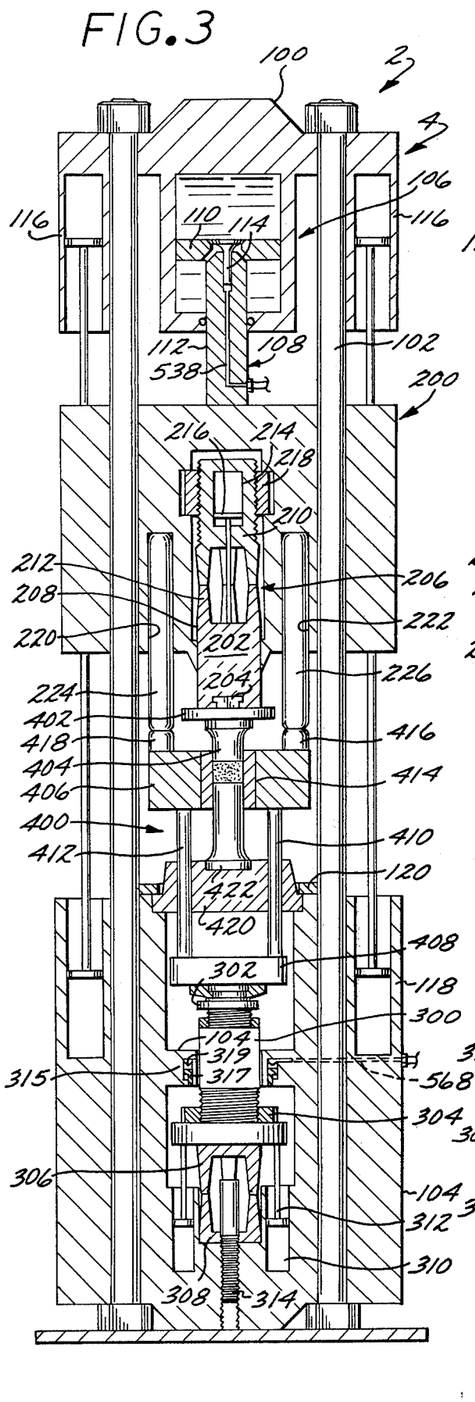
FIG. 3 is a front schematic cross-sectional view of the press of the present invention in a final press position.

Reference is now made to FIG. 3 wherein the final part compacting operation is disclosed. As can be appreciated, the part is fully compacted to positive mechanical stops and any relative stretching of the tie rods 102 in tension will have no effect on maintaining an accurate compacted part height. Thus, the press 2 is quite capable of insuring a high degree of part accuracy regardless of the specific volume of powder fill in the die 414. As can be seen, the high pressure main drive cylinder 106 or power means has exerted a unidirectional compressive force stroke during the entire pressing cycle of part formation and both the upper ram assembly, the movable die set 400 and fixed lower punch assembly have only been subjected to compressive forces.

After this final compacting of the part, the pressure in the high pressure main drive cylinder 106 is released and the lower rotatable intermeshing stop 308 and the upper rotatable stop member 210 are rotated by pressure cylinders (not shown). The rotation of the upper rotatable stop bearing member 210 causes the threaded portion of this stop member 210 to rotate within the punch entry adjustment nut 218 thereby raising the upper rotatable stop 210 away from the serrated load bearing stop member 208 prior to any significant vertical movement.

The high pressure main drive cylinder 106 is again pressurized forcing the upper ram frame 200 downward along with the die set members comprising the die table 406, die set tie rods 410 and 412 and the lower die set platen 408. This movement is accommodated by the collapsing of the respective upper and lower stop members permitting a withdrawal die movement for release of the compacted part. At the same time, the upper punch 404 can either be retracted by the upper ram retract cylinder 214 or if desired, can be utilized to maintain a preset pressure against the compacted part until it is finally ejected from the die 414. When it is desired to maintain this preset pressure, the upper ram retract cylinder 214 performs the function of a hydraulic spring thereby supporting the compacted part during the ejection cycle. As can be appreciated, any time during the ejection cycle, hydraulic pressure can be applied to the bottom side of the upper ram retract cylinder 214 to thereby lift the upper punch 404 away from the compacted part. This counter movement of the upper punch 404 can occur while still permitting the high pressure main drive cylinder 106 to exert a unidirectional compressive force stroke throughout the entire ejection cycle.

Figure 4:
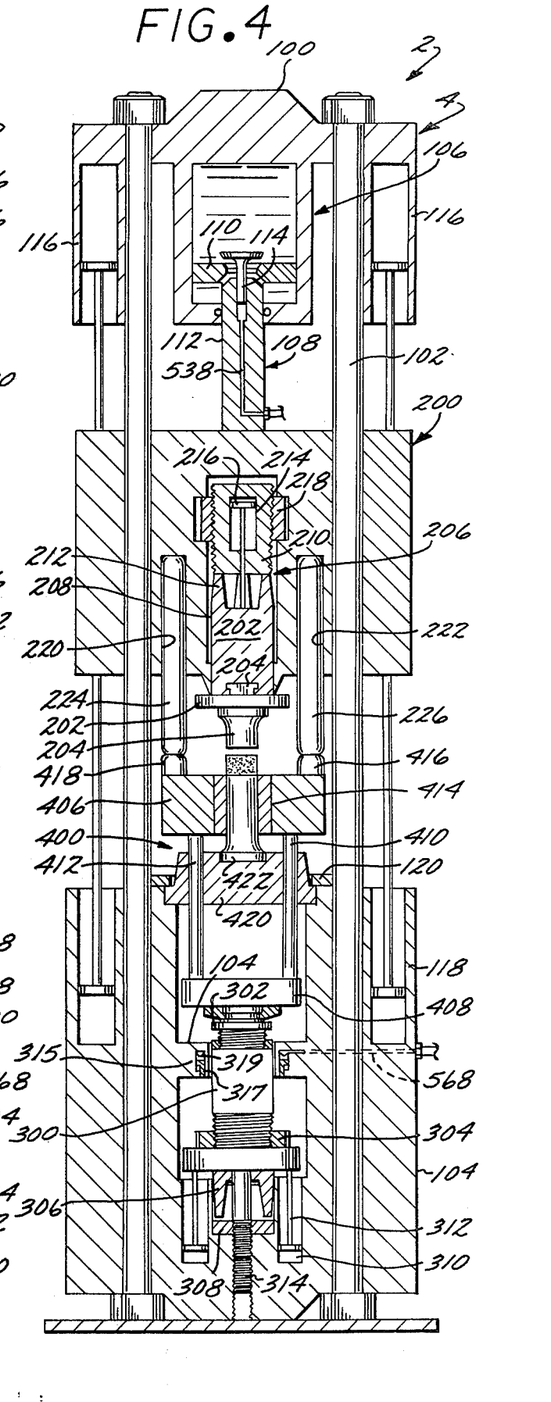
FIG. 4 is a front schematic cross-sectional view of the press of the present invention in a final ejection position.

Referring to FIG. 4, the ejection cycle has been completed and the compacted part has been ejected from the die 414. The pressure in the main drive cylinder 106 is released and a powder feed shoe (not shown) is allowed to move traverse to the surface of the die table 406 to push the compacted part off of the lower punch 422. The internal transfer valve 114 is opened with hydraulic pressure supplied from the low pressure system through the pilot line. Additionally, the low pressure system applies pressure to the lower side of the auxiliary drive cylinders 116 to permit rapid movement of the upper ram 200 and return to the fill position disclosed in FIG. 1. During this upward movement, hydraulic oil is continually being transferred from the upper half to the lower half of the high pressure cylinder 106 through the internal transfer valve 114 and surplus oil is returned to tank.

The die set return cylinder 310 forces the lower ram 300 upward along with the die table 406, die set platen 408 and the die set tie rods 410 and 412. This upward movement stops at a predetermined position which can be adjusted by rotation of the fill adjustment nut 304. During this upward movement, the die cavity can be optionally filled by the powder feed shoe. As the feed show is retracted, the upper ram 202 is pushed down by the ram retract cylinder 214 and the respective push rods 224 and 226 are repositioned away from their bottomed out position shown in FIG. 4. Both the upper and lower rotatable stop member 210 and 308 are again rotated to the compact position.

The press 2 is returned to the position disclosed in FIG. 1 and is now ready to repeat its cycle.

F. Hydraulic Pressure System

Figure 5:
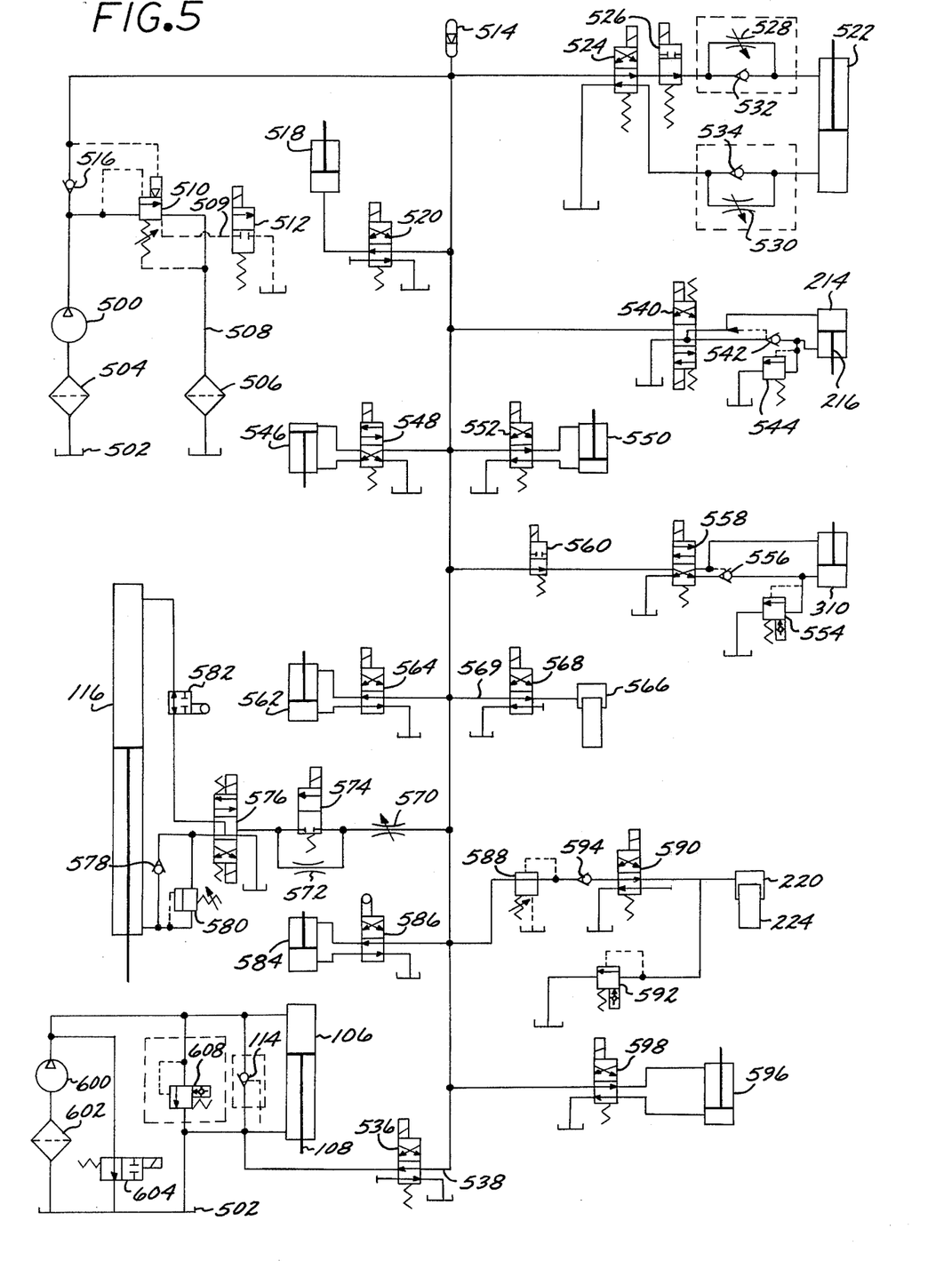
FIG. 5 is a schematic of the hydraulic circuit of the press.

The press 2 of the present invention utilizes a dual hydraulic pressure system to minimize the operational time cycle for part formation as can be seen in the hydraulic schematic of FIG. 5. A lower pressure pump 500, capable of generating a constant pressure of approximately 500 psi, is connected to a sump 502 through a pair of filters. A coarse filter 504 is directly connected in the intake line from the sump 502 to the pump 500. A micron sized filter 506 is positioned in a bypass line 508 to clean the hydraulic fluid exhausted to the sump 502.

A differential unloading relief valve 510 is mounted in the bypass line 508 to maintain a constant reference pressure for the low pressure system. Whenever the predetermined preset pressure such as 500 psi is reached, the differential valve 510 can be shifted to unload the pump 500 directly to the sump tank 502 through the filter 506. A low pressure override valve 512 is further connected to a second bypass line 509 so that at any time during the pressing cycle, the low pressure pump 500 can be immediately unloaded to the sump 502. This particular hydraulic circuit arrangement can relieve the horsepower requirement for the low pressure pump 500 and further make this power available for the high pressure system, while also permitting filtration of the hydraulic oil during this time period. Any necessary low pressure requirements for the press operation during this interval can be taken care of by an accumulator 514. Finally, a check valve 516 can isolate the low pressure system from the low pressure pump 500 whenever the low pressure pump 500 is being unloaded.

As mentioned earlier, hydraulic die set clamps 120 are mounted on the lower frame 104. Die set clamp cylinders 518 are connected to the low pressure system through a two position solenoid control valve 520. The control valve 520 is normally opened and the cylinders are held in a clamping position unless the valve 520 is actuated to permit the oil in the cylinders 518 to drain to the sump 502.

The movement of the feed shoe (not shown) is controlled by a pressure cylinder 522 that is also connected to the low pressure system. Solenoid control valve 524 controls the movement of the feed shoe as it advances over the die and also as it returns to a retracted position. Valve 524 is maintained in a normally open position to assure that the feed shoe is in a retracted position. Solenoid valve 526 can override control valve 524 to stop the feed shoe after the compacted part is pushed off the lower punch 422. Thus, an interruption in the feed shoe movement is provided wherein the part is ejected and the feed shoe pauses prior to moving over the die cavity for the filling mode of operation. Adjustable restrictors 528 and 530 and check valves 532 and 534 can control the rate of advancement and retraction of the feed shoe. The respective variable restrictors 528 and 530 can be subjectively and independently set either manually or automatically through electric solenoids (not shown) for any specific speed.

A solenoid operated transfer valve 536 is also connected to the lower pressure hydraulic system and controls a pilot line 538 that is connected to the internal transfer valve 114 mounted within the high pressure drive piston 108.

The upper ram retract cylinder 214 is controlled by a solenoid activated three-way position valve 540 which is normally blocked from the low pressure system until it is actuated. The pilot check valve 542 and the pilot release valve 544 cooperate to prevent the piston 216 from any undesired movement or drift.

Some of the auxiliary features of the press 2, include a knock out pressure cylinder 546 and core rod pressure cylinder 550 that are respectively connected to the low pressure system through control valves 548 and 552. The knock out pressure cylinder 546 can optionally be used for volume transfer, for a secondary upper punch or to actuate an upper core rod. Control valve 548 normally maintains the piston in cylinder 546 in a retracted position. The control valve 552 is also normally opened to maintain the core rod piston in a retracted position. The core rod cylinder and the knock out cylinder are conventional and accordingly are not shown in FIGS. 1 to 4.

The die set return cylinder 310 is pushed downward by the push rods 224 and 226 during the prepress movement shown in FIG. 3 and the ejection movement shown in FIG. 4. The counter force created when die set return cylinders are pushed down can be controlled by an electronic solenoid activated valve 554. Accordingly, the valve 554 can be set to a predetermined pressure that is monitored by an electronic pressure sensor and the valve will remain closed until that pressure is reached. In checking out the tooling set up, if the control valve 558 is shifted, the die set will be pulled down to the press or ejection position depending upon the position of the lower rotatable intermeshing stop 308. The check valve 556 would then be piloted open so that oil from the lower half of the cylinder 310 can be discharged to the sump 502. Valve 560 can be closed during the press operation to cut-off return pressure and to prevent any tendency for the die set to bounce.

The upper rotatable stop member 210 is normally held in the position shown in FIG. 1 by the pressure cylinder 562 which, in turn, is controlled by the control valve 564.

An auxiliary underfill and overfill cylinder 566 is controlled by a control valve 568 connected to the low pressure system.

As mentioned above, the low pressure auxiliary drive cylinders 116 are directly connected to the upper ram frame 200 to move it up and down at a rapid speed until greater pressure is required by driving the main high pressure cylinder 106. The variable restrictor 570, the constant restrictor 572 and the solenoid operated on/off valve 574 control the speed or rate of movement of the auxiliary cylinders. A three position valve 576 is normally positioned so that the top of the auxiliary cylinders 116 are always vented to the sump 502 unless valve 576 is actuated. Check valve 578 and variable release valve 580 are used to prevent any undesired movement of the pistons in the pressure cylinders. Basically, a small hydraulic force must be generated to open valve 580 before the exhausting hydraulic fluid can flow to the sump tank 502. A cam operated manual valve 582 functions as a speed control for the movement of the pistons in the auxiliary drive cylinders 116 and can be actuated on both the up stroke as well as the down stroke of these pistons.

Another hydraulic drive pressure cylinder 584 will provide another press auxiliary feature of releasing a second platen if a die set with a second platen is used. A control valve 586 such as a cam operated valve controls the introduction of low pressure hydraulic fluid.

A portion of the push rod control means for respectively positioning the push rods 224 and 226 at a predetermined position relative to the upper punch holder 402 for providing a prepress movement of the die table and holder 406, providing a positive mechanical stop during the final press compacting of the part and pushing the die table and holder 406 vertically downward relative to the fixed lower punch 422 during ejection of the formed part is disclosed in FIG. 4. As can be seen in FIG. 5, the push rod 224 is extended from the push rod hydraulic cylinder 220, and variable reducing valve 588 can be preset to reduce the pressure applied to the push rod cylinder 220 when the press 2 is in a filling mode of operation. Valve 590 can be actuated to remove hydraulic pressure from behind the push rod 224 when the stroke of the push rod is adjusted. An electronically controlled relief valve 592 is capable of being adjusted to provide a predetermined prepress force on the push rods before they will collapse and bottom out within the push rod cylinders. Finally, a check valve 594 blocks the feed hydraulic line during the prepress mode operation.

The lower rotary stop 306 is normally held in the position shown in FIG. 1 by a pressure cylinder 596 which, in turn, is controlled by the solenoid operated control valve 598.

The high pressure hydraulic system utilizes a pump 600 to supply oil to the high pressure cylinder 106. The pump 600 draws oil from the sump tank 502 through a coarse filter 602. A solenoid activated control valve 604 controls a bypass line 606 for releasing the high pressure hydraulic oil directly to the sump 502 when it is not necessary to activate the main pressure cylinder 106.

The high pressure cylinder 106 and the high pressure piston 108 are disclosed schematically with the internal transfer valve 114 shown as a pilot controlled check valve connected to the pilot line 538. Actually, as shown in FIG. 1 the internal transfer valve 114 is an integral part of the piston head 110 and piston stem 112. As can be appreciated, the transfer valve 536 can control the opening of the internal transfer valve 114 to permit the transfer of oil from one side to the other side of the high pressure cylinder piston 110. Finally, a variable controlled remote electronic controlled relief valve 608 can control the desired operating pressure within the high pressure cylinder 106.

While the above embodiments have been disclosed as the best mode presently contemplated by the inventors, it should be realized that these examples should not be interpreted as limiting, because artisans skilled in this field, once given the present teachings, can vary from these specific embodiments.

Accordingly, the scope of the present invention should be determined solely from the following claims in which we claim:

1. An improved press assembly capable of forming parts from compactible powder with the use of an upper punch holder, a movable die holder assembly and a fixed lower punch assembly comprising,
   a stationary support assembly;
   an upper ram assembly relatively movable to the stationary support assembly having a first mounting means for an upper punch holder;
   a lower ram assembly relatively movable to the stationary support assembly having a second mounting means for connection with a movable die holder assembly;
   third mounting means on the stationary support assembly for connection with a fixed lower punch assembly;
   first power means operatively connected to the upper ram assembly for exerting a compressive force in a vertical direction;
   a push rod assembly mounted on the upper ram assembly having a pair of push rods hydraulically mounted for relative movement to the upper ram assembly, and
   push rod control means respectively, positioning the push rods at a predetermined position relative to the upper punch holder for providing a prepress movement of the die holder, providing a positive mechanical stop during the final press compacting of the part and pushing the die holder vertically downward relative to the fixed lower punch assembly during ejection of the formed part.

2. The invention of claim 1 further including means for permitting countermovement of the first mounting means relative to the movable die holder assembly prior to ejection of the formed part while permitting the first power means to exert a unidirectional compressive force stroke during a pressing and ejection cycle of part formation, the upper ram assembly, movable die assembly and fixed lower punch assembly only being subjected to compressive forces during the compressive stroke of the first power means.

3. The invention of claim 1 further including a first source of high pressure hydraulic fluid and a first power means operatively connected to the upper ram assembly and the high pressure source for exerting a principle compressive force during compaction of the powder into a part.

4. The invention of claim 1 further including a first mechanical stop assembly adjustably mounted between the first power means and the first mounting means for permitting relatively vertical movement.

5. The invention of claim 1 further including means to set up die tooling to a specific press position having three positive mechanical stop assemblies, one stop assembly is connected to the upper ram assembly, a second stop assembly is connected to the lower ram assembly and the push rods comprise a part of a third stop assembly.

6. The invention of claim 1 further including hydraulic clamps to secure a removable die set relative to the stationary support assembly.

7. The invention of claim 1 further including an adjustable fill nut connected to the lower ram assembly and an over and underfill piston cylinder assembly mounted concentrically with and interacting with the adjustable fill nut.

8. The invention of claim 3 further including a second source of relatively lower pressure hydraulic fluid and a second power means operatively connected to the upper ram assembly and the lower pressure source for exerting an auxiliary force on the upper ram assembly.

9. The invention of claim 8 wherein the second source of lower pressure hydraulic fluid includes an accumulator.

10. The invention of claim 3 wherein the first power means includes a power cylinder and a piston assembly, the piston assembly having a bypass valve within the cylinder to pass hydraulic fluid from one side to the other side of the piston assembly.

11. The invention of claim 4 wherein the first mechanical stop assembly includes a first and second stop member, at least one stop member mounted for rotational movement to permit at least a first and second positional placement of the first mounting means.

12. The invention of claim 4 further including a second mechanical stop assembly mounted between the stationary support assembly and the second mounting means whereby predetermined stop positions can be provided during compression and ejection.

13. The invention of claim 10 wherein the bypass valve is mounted within the piston assembly.

14. The invention of claim 7 further including means for initially relieving stress between the first and second stop members after compacting prior to significant movement in a vertical direction.

15. The invention of claim 9 further including a retract cylinder and piston assembly connected to the first mounting means and the second low pressure source, the retract piston extending through the first mechanical stop assembly.

16. The invention of claim 9 wherein the second source of lower pressure hydraulic fluid includes a low pressure pump, a check valve, a sump tank, a bypass line, and a differential valve that can relieve the horsepower requirement of the low pressure pump and unload the pump through the bypass line to the sump tank, the check valve isolating the accumulator during any unloading of the low pressure pump.

17. The invention of claim 15 further including a control valve which is biased to block the retract cylinder from the second low pressure system.

18. The invention of claim 16 further including a filter mounted in the bypass line to permit automatic filtration of the hydraulic fluid during unloading.

19. The invention of claim 17 further including a pilot check valve and a pilot release valve to prevent the piston from any undesired movement.

20. A hydraulic press assembly capable of forming parts from compactible powder comprising:
   a stationary support assembly;
   an upper ram assembly relatively movable to the stationary support assembly having a first mounting means for an upper punch holder;
   a first source of high pressure hydraulic fluid;
   a first power means operatively connected to the upper ram assembly and the high pressure source for exerting a principle compressive force during compaction of the powder into a part;
   a second source of relatively lower pressure hydraulic fluid;
   a second power means operatively connected to the upper ram assembly and the lower pressure source for exerting an auxiliary force on the upper ram assembly;
   a lower ram assembly relatively movable to the stationary support assembly having a second mounting means for a movable die holder assembly that is selectively engageable with the compressive force of the first power means for downward movement;
   third mounting means on the support assembly for a fixed lower punch assembly, and
   means for permitting countermovement of the first mounting means relative to the movable die holder assembly prior to ejection of the formed part while permitting the first power means to exert a unidirectional compressive force stroke during a pressing and ejection cycle of part formation, the upper ram assembly, movable die assembly and fixed lower punch assembly only being subjected to compressive forces during the compressive stroke of the first power means.

21. A hydraulic press assembly capable of forming parts from compactible powder comprising;
   a stationary support assembly;
   an upper ram assembly relatively movable to the stationary support assembly having a first mounting means for an upper punch holder;
   a lower ram assembly relatively movable to the stationary support assembly;
   a first hydraulic power means operatively connected in the upper ram assembly for exerting a compressive force through the upper ram assembly including a source of hydraulic pressure, a power cylinder and a piston assembly, the piston assembly having a bypass valve within the cylinder to pass fluid from one side to the other side of the piston assembly;
   a movable die holder assembly selectively engaging with the compressive force of the first power means for downward movement and having a second mounting means for connection to the lower ram assembly;
   a fixed lower punch assembly having a third mounting means capable of connection to the stationary support assembly, and
   means for permitting countermovement of the first mounting means relative to the movable die holder assembly prior to ejection of the formed part while permitting the first power means to exert a unidirectional compressive force stroke during a pressing and ejection cycle of part formation, the upper ram assembly, movable die assembly and fixed lower punch assembly only being subjected to compressive forces during the compressive stroke of the first power means.

22. A hydraulic press assembly capable of forming parts from compactible powder comprising:
   a stationary support assembly;
   an upper ram assembly relatively movable to the stationary support assembly having a first mounting means for an upper punch holder;
   a first hydraulic power means for exerting a compressive force through the upper ram assembly including a source of hydraulic fluid pressure, a power cylinder and a piston assembly, the piston assembly having means to bypass fluid within the cylinder from one side to the other side of the piston assembly;
   second mounting means on the support assembly for mounting a fixed lower punch assembly, and
   means for permitting countermovement of the first mounting means relative to the lower punch assembly prior to ejection of the formed part while permitting the first power means to exert a unidirectional compressive force stroke during a pressing and ejection cycle of part formation.

23. A press assembly capable of forming parts from compactible powder comprising;
   a stationary support assembly;
   an upper ram assembly relatively movable to the stationary support assembly having a first mounting means for an upper punch;
   a first power means operatively connected to the upper ram assembly for exerting a compressive force in a vertical direction;
   a first stop assembly adjustably mounted between the first power means and the first mounting means including a first and second stop member mounted for vertical relative movement;
   means for initially relieving stress between the first and second stop member prior to significant movement in a vertical direction;
   a lower ram assembly relatively movable to the stationary support assembly having a second mounting means for a movable die holder assembly that is selectively engaged with the compressive force of the first power means for downward movement;
   means on the stationary support assembly for mounting a fixed lower punch assembly, and
   means for permitting countermovement of the first mounting means relative to the movable die holder assembly prior to ejection of the formed part while permitting the first power means to exert a unidirectional maximum compressive force stroke during a pressing and ejection cycle of part formation, the upper ram assembly, movable die assembly and fixed lower punch assembly only being subjected to compressive forces during the compressive stroke of the first power means.

24. A hydraulic press assembly capable of forming parts from compactible powder with the use of a removable withdrawal type die set assembly including an upper punch holder, a movable die holder assembly, and a fixed lower punch assembly, comprising:
   a stationary support assembly;
   an upper ram assembly relatively movable to the stationary support assembly having a first mounting means for an upper punch holder;
   a lower ram assembly relatively movable to the stationary support assembly having a second mounting means for connection with a movable die holder assembly;

third mounting means on the stationary support assembly for connection with a fixed lower punch assembly;

a first power means operatively connected to the upper ram assembly for exerting a compressive force in a vertical direction;

a first and second stop assembly each capable of providing bi-level positioning with an intermediate abutment and a final abutment position, the first stop assembly is mounted between the first power means and the first mounting means while the second stop assembly is mounted between the stationary support assembly and the second mounting means whereby predetermined stop positions can be provided during pressing, and means for permitting countermovement of the first mounting means relative to the movable die holder assembly prior to ejection of the formed part while permitting the first power means to exert a unidirectional compressive force stroke during a pressing and ejection cycle of part formation, the upper ram assembly, movable die assembly and fixed lower punch assembly only being subjected to compressive forces during the compressive stroke of the first power means.

25. The invention of claim 24 further including a push rod assembly mounted on the upper ram assembly having a pair of push rods hydraulically mounted for relative movement to the upper ram assembly, and push rod control means respectively, positioning the push rods at a predetermined position relative to the upper punch holder for providing a prepress movement of the movable die holder, providing a positive mechanical stop during the final press compacting of the part and pushing the movable die holder vertically downward relative to the fixed lower punch assembly during ejection of the formed part.

26. The invention of claim 25 further including a first source of high pressure hydraulic fluid and a first power means operatively connected to the upper ram assembly and the high pressure source for exerting a principle compressive force during compaction of the powder into a part.

27. The invention of claim 24 further including hydraulic clamps to secure a removable die set relative to the stationary support assembly.

28. The invention of claim 24 further including an adjustable fill nut connected to the lower ram assembly and an over and underfill piston cylinder assembly mounted concentrically with and interacting with the adjustable fill nut.

29. The invention of claim 26 further including a second source of relatively lower pressure hydraulic fluid and a second power means operatively connected to the upper ram assembly and the lower pressure source for exerting an auxiliary force on the upper ram assembly.

30. The invention of claim 29 wherein the second source of lower pressure hydraulic fluid includes an accumulator.

31. The invention of claim 24 wherein the first power means includes a power cylinder and a piston assembly, the piston assembly having a bypass valve within the cylinder to pass hydraulic fluid from one side to the other side of the piston assembly.

32. The invention of claim 24 wherein the first stop assembly includes a first and second stop member, at least one stop member mounted for rotational movement to permit at least a first and second positional placement of the first mounting means.

33. The invention of claim 31 wherein the bypass valve is mounted within the piston assembly.

34. The invention of claim 32 further including means for initially relieving stress between the first and second stop members prior to significant movement in a vertical direction.

35. The invention of claim 25 further including a retract cylinder and piston assembly connected to the first mounting means and the second low pressure source, the retract piston extending through the first stop assembly.

36. The invention of claim 29 wherein the second source of lower pressure hydraulic fluid includes a low pressure pump, a check valve, a sump tank, a bypass line, and a differential valve that can relieve the horsepower requirement of the low pressure pump and unload the pump through the bypass line to the sump tank, the check valve isolating the accumulator during any unloading of the low pressure pump.

37. The invention of claim 35 further including a control valve which is biased to block the retract cylinder from the second low pressure system.

38. The invention of claim 36 further including a filter mounted in the bypass line to permit automatic filtration of the hydraulic fluid during unloading.

39. The invention of claim 37 further including a pilot check valve and a pilot release valve to prevent the retract piston from any undesired movement.

* * * * *